(12) United States Patent
Gulati et al.

(10) Patent No.: US 10,298,511 B2
(45) Date of Patent: May 21, 2019

(54) COMMUNICATION QUEUE MANAGEMENT SYSTEM

(71) Applicant: Apple Inc., Cupertino, CA (US)

(72) Inventors: Manu Gulati, Saratoga, CA (US); Christopher D. Shuler, Davis, CA (US); Benjamin K. Dodge, San Jose, CA (US); Thejasvi M. Vijayaraj, San Jose, CA (US); Harshavardhan Kaushikkar, San Jose, CA (US); Yang Yang, Mountain View, CA (US); Rong Z. Hu, Saratoga, CA (US); Srinivasa R. Sridharan, San Jose, CA (US); Wolfgang H. Klingauf, San Jose, CA (US); Neeraj Parik, San Jose, CA (US)

(73) Assignee: Apple Inc.

( * ) Notice: Subject to any disclaimer, the term of this patent is extended or adjusted under 35 U.S.C. 154(b) by 157 days.

(21) Appl. No.: 15/246,046

(22) Filed: Aug. 24, 2016

(65) Prior Publication Data

US 2018/0063016 A1    Mar. 1, 2018

(51) Int. Cl.
*H04W 72/12* (2009.01)
*H04L 12/863* (2013.01)
*G06F 13/16* (2006.01)
*G06F 9/54* (2006.01)
*H04L 12/865* (2013.01)

(52) U.S. Cl.
CPC .......... *H04L 47/6295* (2013.01); *G06F 9/546* (2013.01); *G06F 13/1642* (2013.01); *H04L 47/6275* (2013.01)

(58) Field of Classification Search
CPC ....... H04L 47/6295; H04W 72/12; G06F 9/46
See application file for complete search history.

(56) References Cited

U.S. PATENT DOCUMENTS

| | | | |
|---|---|---|---|
| 8,949,555 | B1 | 2/2015 | Karamcheti et al. |
| 2008/0077720 | A1 | 3/2008 | Fanning |
| 2008/0244135 | A1 | 10/2008 | Akesson et al. |
| 2009/0010197 | A1* | 1/2009 | Chao ................. H04H 20/61 370/312 |
| 2010/0273503 | A1* | 10/2010 | Tiedemann, Jr. ....... H04L 47/10 455/453 |

(Continued)

OTHER PUBLICATIONS

International Search Report and Written Opinion in PCT Application No. PCT/US2017/048237 dated Dec. 6, 2017, 14 pages.

*Primary Examiner* — Wei Zhao
(74) *Attorney, Agent, or Firm* — Meyertons, Hood, Kivlin, Kowert & Goetzel, P.C.

(57) ABSTRACT

In some embodiments, a system includes a memory system, plurality of computing devices, and plurality of queues. The plurality of computing devices perform actions dependent on data stored at the memory device, where traffic between the plurality of computing devices and the memory device has at least a first priority level and a second priority level. The first priority level is higher than the second priority level. The plurality of queues pass data between the memory device and the plurality of computing devices. A particular queue allocates a first portion of the particular queue to traffic having the first priority level and allocates a second portion of the particular queue to traffic having the first priority level and to traffic having the second priority level.

20 Claims, 4 Drawing Sheets

(56) References Cited

U.S. PATENT DOCUMENTS

| | | | |
|---|---|---|---|
| 2011/0252428 A1* | 10/2011 | Maruyama | G06F 9/4843 |
| | | | 718/103 |
| 2012/0072678 A1 | 3/2012 | Biswas et al. | |
| 2014/0059557 A1 | 2/2014 | Kramer | |
| 2014/0373021 A1 | 12/2014 | Teixeira et al. | |
| 2015/0293709 A1 | 10/2015 | Quach et al. | |

* cited by examiner

COMMUNICATION QUEUE MANAGEMENT SYSTEM

BACKGROUND

Technical Field

This disclosure relates generally to a communication queue management system.

Description of the Related Art

Correct operation of some electronic systems is predicated on performance of certain actions by computing devices within certain time constraints. If the constraints are violated, in some cases, unwanted system behavior may occur. Often, these actions may utilize communications between the computing devices and memory devices to retrieve data, store data, or both. However, communication channels used by these computing devices may also be used by other devices. In some cases, the communication channels may be unable to support a requested volume of traffic.

One way the communication channels may compensate for receiving too much traffic is to refuse or delay various communications. However, refusing or delaying communications of computing devices under time constraints may cause the constraints to be violated.

SUMMARY

In various embodiments, a communication queue management system is disclosed that includes a memory device, a plurality of computing devices, and a plurality of queues. In some cases, one or more of the plurality of computing devices may be real-time computing devices. The plurality of computing devices are configured to perform actions dependent on data stored at the memory device. The plurality of computing devices and the memory device are configured to communicate via at least one of the plurality of queues. Traffic between the plurality of computing devices and the memory device may have several priority levels including at least a first priority level and a second priority level. The first priority level may be higher priority than the second priority level. In some embodiments, at least a particular queue of the plurality of queues may allocate a first portion of the particular queue to traffic having the first priority level. Additionally, the particular queue may allocate a second portion of the particular queue to traffic having either the first priority level or the second priority level. Accordingly, a portion of the particular queue may be reserved for traffic having the first priority level and the particular queue may block lower priority level traffic but not higher priority level traffic. As a result, in some cases, real-time computing devices relying on the higher priority level traffic may meet respective timing constraints that may be violated in a system that does not include a communication queue management system.

Figure 1:
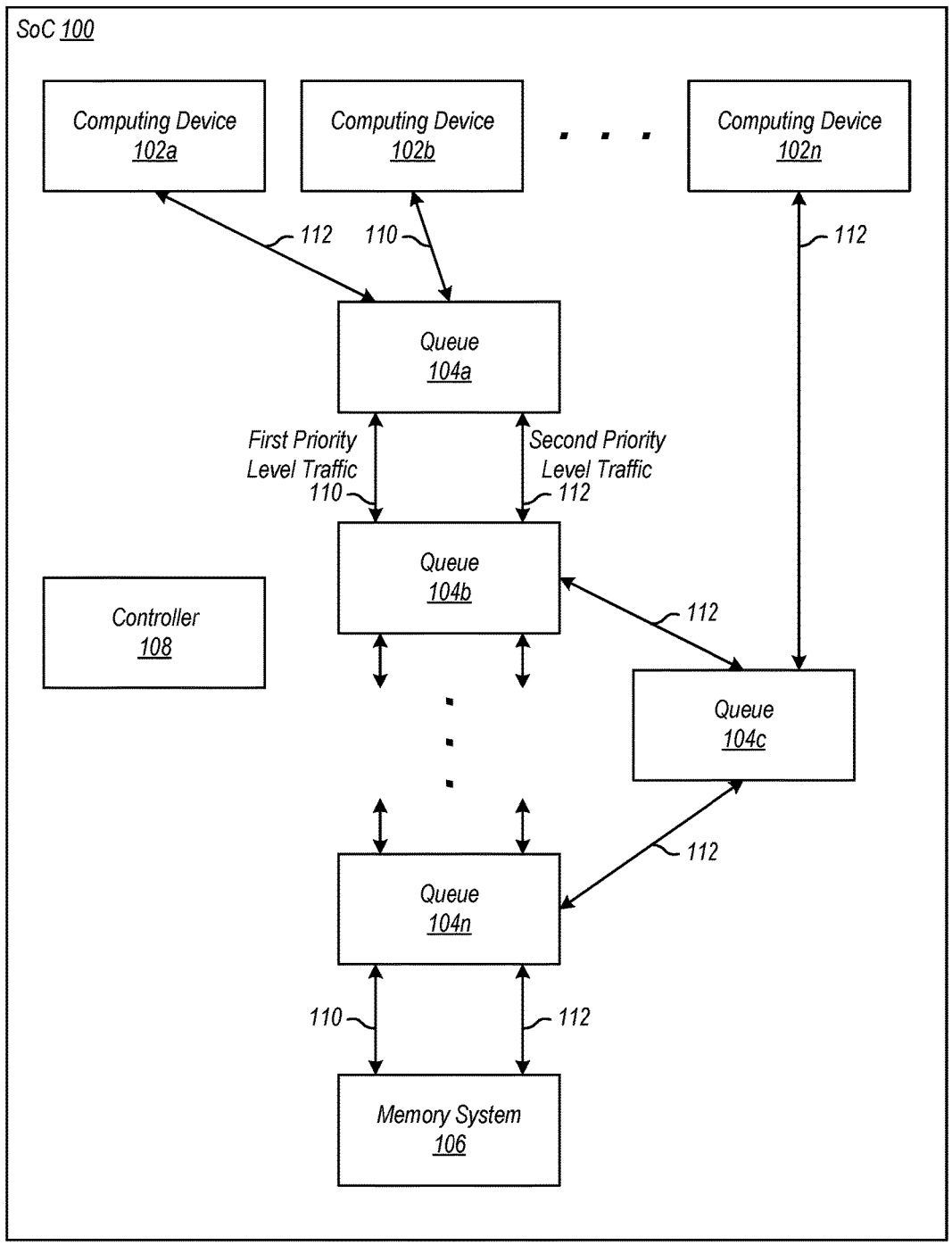
FIG. 1 is a block diagram illustrating one embodiment of a communication queue management system.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "queue configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a memory device that includes six memory locations, the terms "first memory location" and "second memory location" can be used to refer to any two of the six memory locations, and not, for example, just logical memory locations 0 and 1.

When used in the claims, the term "or" is used as an inclusive or and not as an exclusive or. For example, the phrase "at least one of x, y, or z" means any one of x, y, and z, as well as any combination thereof (e.g., x and y, but not z).

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

A communication queue management system is described herein including a memory system, a plurality of computing devices, and a plurality of queues. The queues may pass traffic (e.g., communications) between the plurality of computing devices and the memory system. The traffic may have a variety of priority levels, including, in some cases, traffic involving real-time computing devices having real-time constraints. A first subset of entries of a particular queue may be reserved for traffic having at least a first priority level and a second subset of entries of the particular queue may be reserved for traffic having at least a second priority level (e.g., including the first priority level). As a result, in some cases where an amount of traffic provided to the particular queue exceeds a throughput of the particular queue, higher priority level traffic may not be delayed or denied.

As used herein, "computing devices" is an open-ended term used to refer to a variety of types of devices. In particular, "computing devices" refers to any device that is configured to perform an operation with respect to data stored at a memory system. As discussed herein, "computing devices" refers to at least one of instruction-based processing devices (e.g., instruction set processors) or other devices (e.g., state machines, hard-wired logic, microcode, etc.). The "computing devices" may be connected to other devices described herein by any method known in the art including, for example, being integrated into a same device, one or more local connections, one or more network connections, etc.

As described herein, "real-time" is an open-ended term used to refer to a variety of devices and situations. "Real-time" may refer to a device that performs operations at or as near to immediacy as permitted by device operating parameters. "Real-time" is used not as an expression of necessity, but as a description of general behavior of the device. In particular, "real-time" may refer to situations where intended operation of the device is based on a time constraint. The device failing to satisfy the time constraint may not, in some cases, result in failure of the device, but failure may be likely. As used herein, "real-time" is expressly intended to include "near real-time," as is known in the art.

In various embodiments, the communication queue management system further includes a controller. The controller may regulate traffic at least some of the plurality of queues. For example, the controller may upgrade a priority level for traffic (e.g., a single communication or multiple communications) between a particular computing device and the memory system from a second priority level to a first priority level.

This disclosure initially describes, with reference to FIG. 1, various embodiments of system on a chip (SoC) that includes a communication queue management system. Example processes performed by various embodiments of a queue of a communication queue management system are described with reference to FIG. 2. A method performed by a queue of an embodiment of a communication queue management system is described with reference to FIG. 3. Finally, an embodiment of a computing system that includes a communication queue management system is described with reference to FIG. 4.

Turning now to FIG. 1, a block diagram of various embodiments of a communication queue management system is shown. In the illustrated embodiment, the communication queue management system includes system on a chip (SoC) 100. SoC 100 includes computing devices 102a-n, queues 104a-n, memory system 106, and controller 108. In various embodiments, SoC 100 may include multiple instances of various components. For example, SoC 100 may include multiple controllers 108, where at least some of the multiple controllers 108 correspond to different queues of queues 104a-n. Further, in some embodiments, various components may be external to SoC 100. For example, memory system 106 may be external to SoC 100.

Queues 104a-n may forward traffic between computing devices 102a-n and memory system 106. Queues 104a-n may be memory devices (e.g., buffers) that include a plurality of entries configured to store data involving communications between memory system 106 and computing devices 102a-n as part of forwarding traffic. As further discussed below with reference to FIG. 2, various subsets of queues 104a-n may be reserved for data involving communications having at least a specified priority level. For example, queue 104a may reserve a first subset of entries for first priority level traffic 110. Additionally, queue 104a may reserve a second subset of entries for first priority level traffic 110 and for second priority level traffic 112. Accordingly, in response to occupancy of the entries of queue 104a exceeding a threshold level, queue 104a may refuse second priority level traffic 112 but may accept first priority level traffic 110. In some embodiments, queues 104a-n may have multiple threshold levels corresponding to different minimum priority levels of traffic. Different queues may have different threshold levels. Queues 104a-n may modify the threshold levels based on, for example, an amount of traffic at queues 104a-n, a percentage of traffic at queues 104a-n having a particular priority level, an instruction from another device (e.g., controller 108), or another reason. In some cases, modifying a threshold level may result in a particular queue refusing requests having a particular priority level.

In various embodiments, first priority level traffic 110 may be one or more communications from a particular computing device (e.g., computing device 102b) to memory system 106 or vice versa, where the one or more communications have the first priority level. For example, first priority level traffic 110 may include one or more memory requests for data stored at memory system 106. As another example, first priority level traffic 110 may include one or more requests to store data (e.g., image data from an image sensor processor) at memory system 106. Additionally, in some cases, first priority level traffic 110 may include other requests, such as a request for memory system 106 to delete a data object or for memory system 106 to enter a particular mode (e.g., a sleep mode). Similarly, second priority level traffic 112 may be one or more communications from a particular computing device (e.g., computing device 102a) to memory system 106 or vice versa, where the one or more communications have the second priority level. Although traffic having only two priority levels are shown in the illustrated embodiment (first priority level traffic 110 and second priority level traffic 112), in some embodiments, more than two priority levels may be used.

In the illustrated embodiment, a communication may pass through multiple queues to pass from a particular computing device (e.g., computing device 102a) to memory system 106 or vice versa. Additionally, in various embodiments, traffic may take various routes between computing devices 102a-n and memory system 106. These routes may be determined based on various factors such as, for example, a number of unoccupied entries at a particular queue (e.g., a source queue or a destination queue), content of the traffic, a priority level of the traffic, a specified route, or other factors. In some embodiments, some queues (e.g., queue 104c) may not be configured to forward traffic having one or more priority levels (e.g., first priority level traffic 110) and may refuse incoming traffic having the one or more priority levels. As a result, queues 104a-n may reduce a likelihood that second priority level traffic 112 delays first priority level traffic 110.

Memory system 106 may include one or more memory devices and may store data at various memory locations of the one or more memory devices. For example, memory system 106 may include one or more of a system memory, a cache memory, or a main memory. Memories of memory system 106 may be embodied in one or more volatile memory devices or non-volatile memory devices. For example, memories of memory system 106 may be embodied in one or more of a static random access memory (SRAM) device, a dynamic random access memory (DRAM) device, a flash memory device, or another memory device. Additionally, memory system 106 may include one or more other devices associated with memory. For example, memory system 106 may include one or more memory controllers, buffers, interconnects, etc. Accordingly, memory system 106 may store data in response to one or more communications from computing devices 102a-n and may additionally provide data in response to one or more communications from computing devices 102a-n. Access to memory system 106 may be controlled using at least one internal memory controller. In some embodiments, controller 108 may be a memory controller of memory system 106 and may control access to at least a portion of memory system 106. In some embodiments, queues 104a-n may be part of memory system 106. By reserving respective portions for communications having various priority levels, queues 104a-n may implement a virtual pathway or channel between a computing device (e.g., computing device 102b) and memory system 106 that is more likely to be available, as compared to a system where queues do not reserve respective portions for communications having various priority levels.

Computing devices 102a-n may communicate with memory system 106 via queues 104a-n. In various embodiments, computing devices 102a-n may request data from memory system 106, may send data to be stored at memory system 106, or both. The traffic between computing devices 102a-n and memory system 106 may have respective priority levels. For example, in the illustrated embodiment, traffic between computing device 102a and memory system 106 is second priority level traffic 112. As another example, in the illustrated embodiment, traffic between computing device 102b and memory system 106 is first priority level traffic 110. In some embodiments, one or more of computing devices 102a-n (e.g., computing devices having first priority level traffic 110) may be real-time computing devices. Accordingly, one or more of computing devices 102a-n may be configured to perform one or more operations using data in first priority level traffic 110 subject to a scheduling constraint. For example, in some cases, one or more of computing devices 102a-n may be image sensor or signal processors (ISPs) configured to generate image data at a particular rate and store the image data at memory system 106 (e.g., without overflowing a local buffer). In some cases, one or more of computing devices 102a-n may be display devices configured to receive data from memory system 106 and to output the data (e.g., at a display) at a particular rate (e.g., without underflowing a local buffer). In some cases, one or more of computing devices 102a-n may be an instruction set processor or another device configured to communicate with memory system 106. SoC 100 may also include one or more computing devices (e.g., ISPs, display devices, instruction set processors, etc.) that are not subject to a scheduling constraint. In the illustrated embodiment, all traffic between computing devices 102a-n and memory system 106 has a single, respective, priority level. However, in other embodiments, different communications between computing devices 102a-n and memory system 106 may have different priority levels (e.g., depending on the content of the communications). In some embodiments, different computing devices may communicate with memory system 106 via different queues. For example, in the illustrated embodiment, computing device 102a communicates with memory system 106 via queue 104a and computing device 102n communicates with memory system 106 via queue 104c.

Controller 108 may regulate at least a portion of queues 104a-n. In particular, for example, controller 108 may instruct queues 104a-n to upgrade a priority of traffic for the particular computing device based on an amount of traffic for the particular computing device, content of the traffic, a traffic upgrade request, or another reason. For example, controller 108 may upgrade traffic for computing device 102a from second priority level traffic 112 to first priority level traffic 110 in response to the traffic being refused a particular number of times or delayed by a particular amount of time. As another example, in response to a traffic upgrade request from computing device 102a, controller 108 may instruct queues 104a-n to upgrade traffic for computing device 102a from second priority level traffic 112 to first priority level traffic 110. The instruction to upgrade the priority of the traffic may, in some embodiments, include an agent identifier of the particular computing device. The traffic upgrade request may be received from the particular computing device, memory system 106, or another device. Additionally, controller 108 may downgrade a priority of traffic for a particular computing device. Controller 108 may downgrade the priority based on an amount of traffic for the particular computing device, content of the traffic, a traffic downgrade request, or another reason. For example, subsequent to the priority of the traffic for the particular computing device being upgraded, in response to detecting that computing device 102a has not sent a request for a particular amount of time (e.g., because an output queue of computing device 102a is empty), controller 108 may instruct queues 104a-n to downgrade traffic for computing device 102a from first priority level traffic 110 to second priority level traffic 112.

In some embodiments, controller 108 may modify a number of entries allocated to various priority levels of traffic at queues 104a-n (e.g., limiting a number of requests of a particular priority level that corresponding queues will accept during a particular window of time). For example, based on an amount of first priority level traffic 110 exceeding a number of entries at queue 104a allocated to first priority level traffic 110, controller 108 may request that queue 104a modify one or more threshold levels such that additional entries are allocated to first priority level traffic 110. In some cases, controller 108 may request that a particular queue refuse requests of a particular priority level (e.g., by requesting that one or more corresponding thresholds be modified).

In some embodiments, SoC 100 may implement a quality of service (QoS) framework where traffic is differentiated for prioritization purposes. A QoS framework may be implemented when some traffic is subject to a time constraint such that some traffic is more urgent than other traffic. The first priority level traffic 110 may indicate a highest priority of traffic in the QoS framework (e.g., red traffic), and the second priority level traffic 112 may indicate a lower priority of traffic in the QoS framework (e.g., an intermediate priority such as yellow traffic). Additionally, if more than two priority levels are used, other priority level traffic may indicate other priorities of traffic in the QoS framework (e.g., a lowest priority such as green or general traffic).

Figure 2:
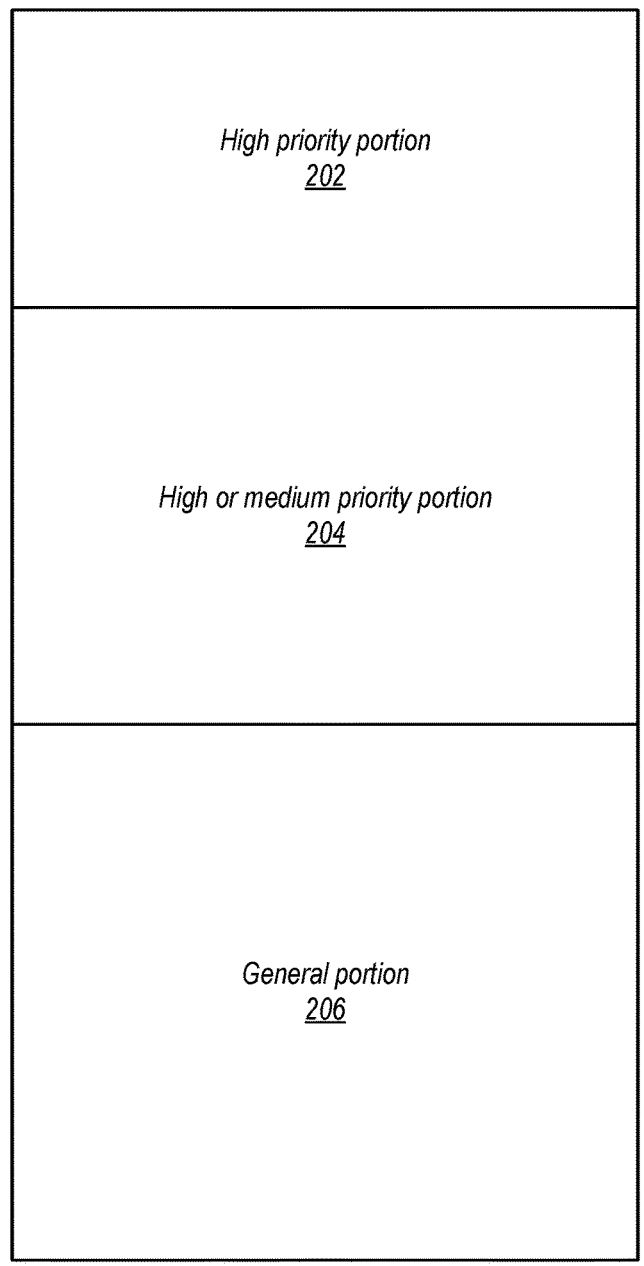
FIG. 2 is a block diagram illustrating a queue of one embodiment of a communication queue management system.

Turning now to FIG. 2, a block diagram illustrating a queue 104 of an embodiment of a communication queue management system is shown. In the illustrated embodiment, queue 104 includes a plurality of entries divided into several portions: high priority portion 202, high or medium priority portion 204, and general portion 206. Although, in the illustrated embodiment, queue 104 is divided into three portions, in other embodiments, queue 104 may be divided into two portions or more than three portions.

Queue 104 may be filled in several ways. A first method of filling queue 104 involves filling general portion 206 prior to filling high or medium priority portion 204 or high priority portion 202. For example, if queue 104 is empty and receives a high priority communication, queue 104 may store data corresponding to the high priority communication in general portion 206. As a result, in some cases, queue 104 may devote more space to higher priority traffic, which may reduce a likelihood that higher priority traffic is delayed. A second method of filling queue 104 involves filling portions of queue 104 reserved for higher priority traffic prior to filling more general portions of queue 104. For example, if queue 104 is empty and receives a high priority communication, queue 104 may store data corresponding to the high priority communication in high priority portion 202. As a result, in some cases, queue 104 may be more likely to use more entries of queue 104, as compared to the first method, because entries of general portion 206 may be less likely to be used by high priority traffic. Other methods of filling queue 104 may also be used. Additionally, queue 104 may switch between methods. For example, in response to an amount of high priority traffic exceeding a threshold level, queue 104 may use the first method of filling queue 104. In response to the amount of high priority traffic being less than the threshold level, queue 104 may use the second method of filling queue 104.

As discussed above with reference to FIG. 1, a number of entries of queue 104 allocated to various priority levels (e.g., a size of high priority portion 202, a size of high or medium priority portion 204, and a size of general portion 206) may be based on one or more threshold levels. In the illustrated embodiment, a number of entries allocated to general portion 206 may be based on a first threshold level. Additionally, a number of entries allocated to high priority portion 202 may be based on a second threshold level. In the illustrated embodiment, a number of entries allocated to high or medium priority portion 204 may be based on the first threshold level and the second threshold level. The first threshold level and the second threshold level may be modified as discussed above. In various embodiments, the entries of various portions of queue 104 may not be contiguous within queue 104. In other embodiments, queue 104 may be configured to output data from high priority portion 202 before high or medium priority portion 204 and to output data from high or medium priority portion 204 before general portion 206. In some embodiments, traffic having a particular priority level may be disabled by manipulating the threshold levels. For example, queue 104 may be configured to refuse all traffic having a low priority level by setting the first threshold level to zero, causing all entries in the illustrated embodiment to be allocated to high priority portion 202 or high or medium priority portion 204. In some embodiments, queue 104 may be configured to refuse specific priority levels of traffic (e.g., medium priority traffic) or traffic having certain content.

Figure 3:
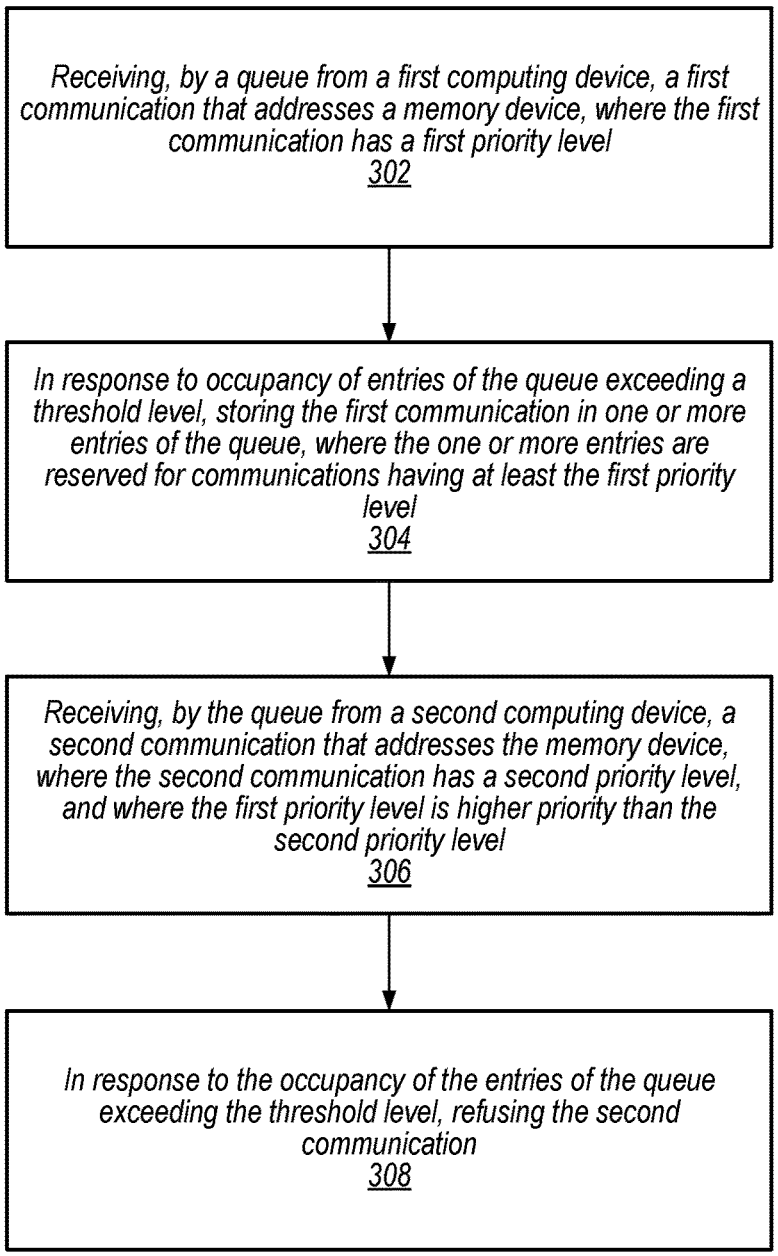
FIG. 3 is a flow diagram illustrating one embodiment of a method of operating a queue of a communication queue management system.

Referring now to FIG. 3, a flow diagram of a method 300 is depicted. Method 300 is an embodiment of a method of operating a queue of a communication queue management system. In some embodiments, method 300 may be initiated or performed by one or more processors in response to one or more instructions stored by a computer-readable storage medium.

At 302, method 300 includes receiving, by a queue from a first computing device, a first communication that addresses a memory device. The first communication may have a first priority level. For example, method 300 may include queue 104b of FIG. 1 receiving, from computing device 102b via queue 104a, a communication that addresses a memory device of memory system 106, where the communication is first priority level traffic 110.

At 304, method 300 includes, in response to occupancy of entries of the queue exceeding a threshold level, storing the first communication in one or more entries of the queue. The one or more entries may be reserved for communications having at least the first priority level. For example, the first priority level may correspond to a high priority communication, as discussed with reference to FIG. 2. Method 300 may include queue 104 of FIG. 2 storing the first communication in high priority portion 202 in response to occupancy of queue 104 exceeding a threshold level (e.g., corresponding to high or medium priority portion 204 and general portion 206 being full).

At 306, method 300 includes receiving, by the queue from a second computing device, a second communication that addresses the memory device. The second communication may have a second priority level. The first priority level may be higher than the second priority level. For example, method 300 may include queue 104b of FIG. 1 receiving, from computing device 102a via queue 104a, a communication that addresses a memory device of memory system 106, where the communication is second priority level traffic 112.

At 308, method 300 includes, in response to the occupancy of the entries of the queue exceeding the threshold level, refusing the second communication. For example, the second priority level may correspond to a general priority communication, as discussed with reference to FIG. 2. Method 300 may include queue 104 of FIG. 2 refusing the second communication in response to occupancy of queue 104 exceeding a threshold level (e.g., corresponding to high or medium priority portion 204 and general portion 206 being full). Accordingly, a method of operating a queue of a communication queue management system is depicted.

In some embodiments, occupancy of the queue may exceed the threshold level without a corresponding portion of the queue being full. For example, the occupancy may additionally reflect occupancy of other portions of the queue. Accordingly, the queue may refuse traffic having certain priority levels in response to receiving at least a particular amount of traffic, regardless of where data corresponding to the traffic is stored.

Figure 4:
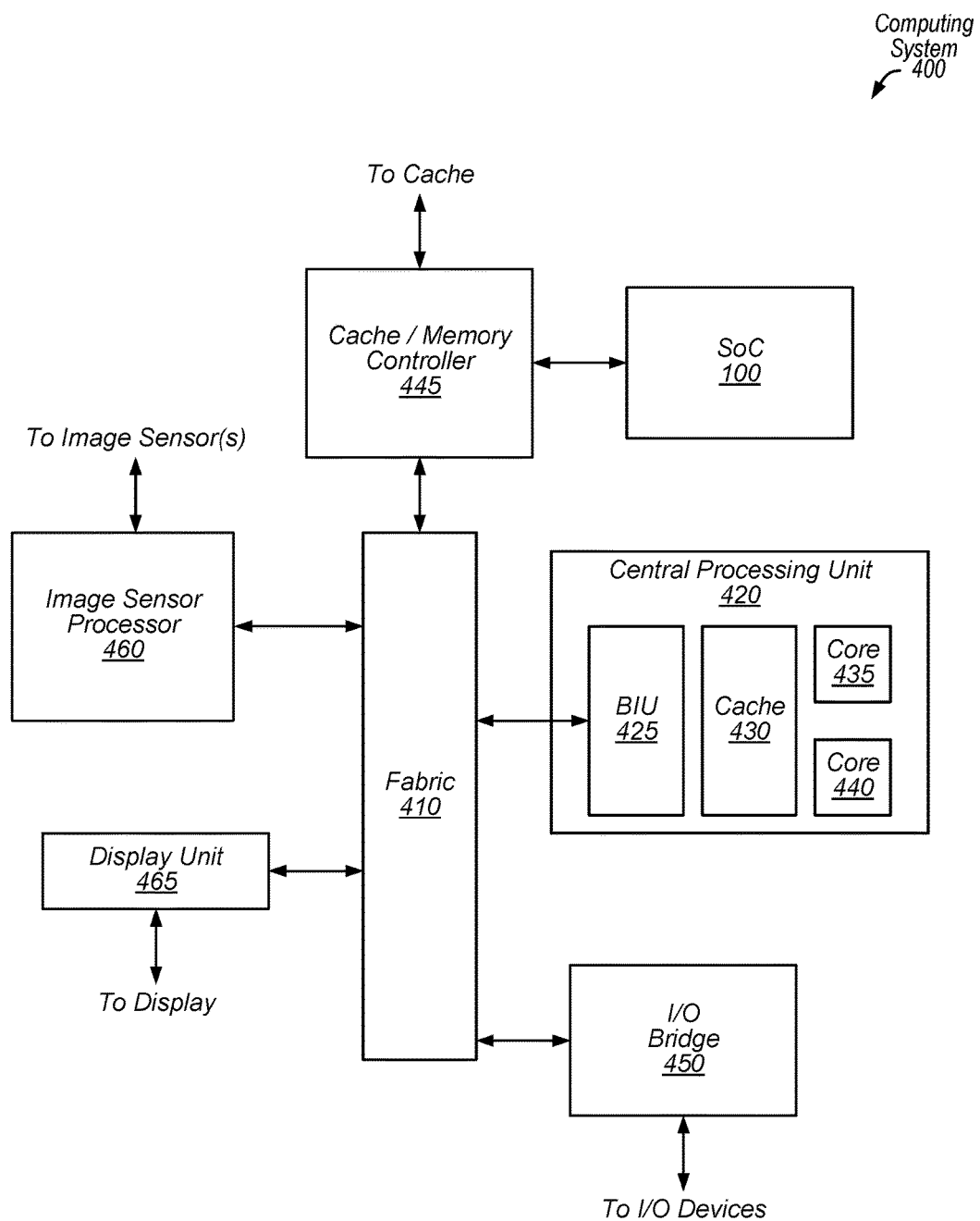
FIG. 4 is block diagram illustrating an embodiment of a computing system that includes at least a portion of a communication queue management system.

Turning next to FIG. 4, a block diagram illustrating an embodiment of a computing system 400 that includes at least a portion of a communication queue management system. Computing system 400 may include various circuits described above with reference to FIGS. 1-3. Computing system 400 may further include any variations or modifications described previously with reference to FIGS. 1-3. In some embodiments, some or all elements of the computing system 400 may be included within a system on a chip (SoC). In some embodiments, computing system 400 is included in a mobile device. Accordingly, in at least some embodiments, area, timing, and power consumption of computing system 400 may be important design considerations. In the illustrated embodiment, computing system 400 includes fabric 410, central processing unit (CPU) 420, input/output (I/O) bridge 450, cache/memory controller 445, display unit 465, and SoC 100. Although computing system 400 illustrates only a single instance of SoC 100, in other embodiments, SoC 100 may be located elsewhere (e.g., within fabric 410, within central processing unit 420, or within display unit 465) or in multiple locations. Although computing system 400 illustrates central processing unit 420 as being connected to fabric 410 as a sole central processing unit of the computing system 400, in other embodiments, central processing unit 420 may be connected to or included in other components of the computing system 400 and other central processing units may be present. Additionally or alternatively, the computing system 400 may include multiple central processing units 420. The multiple central processing units 420 may correspond to different embodiments or to the same embodiment.

Fabric 410 may include various interconnects, buses, MUXes, controllers, etc., and may be configured to facilitate communication between various elements of computing system 400. In some embodiments, portions of fabric 410 are configured to implement various different communication protocols. In other embodiments, fabric 410 implements a single communication protocol and elements coupled to fabric 410 may convert from the single communication protocol to other communication protocols internally. In some embodiments, fabric 410 may include SoC 100 or may include one or more portions of SoC 100 (e.g., queues 104a-n).

In the illustrated embodiment, central processing unit 420 includes bus interface unit (BIU) 425, cache 430, and cores 435 and 440. In various embodiments, central processing unit 420 includes various numbers of cores and/or caches. For example, central processing unit 420 may include 1, 2, or 4 processor cores, or any other suitable number. In some embodiments, cores 435 and/or 440 include internal instruction and/or data caches. In some embodiments, a coherency unit (not shown) in fabric 410, cache 430, or elsewhere in computing system 400 is configured to maintain coherency between various caches of computing system 400. BIU 425 may be configured to manage communication between central processing unit 420 and other elements of computing system 400. Processor cores 435 and 440 may be configured to execute instructions of a particular instruction set architecture (ISA), which may include operating system instructions and user application instructions. In some embodiments, central processing unit 420 includes or is included in SoC 100. For example, in some embodiments, cache 430 may correspond to memory system 106.

Cache/memory controller 445 may be configured to manage transfer of data between fabric 410 and one or more caches and/or memories (e.g., non-transitory computer readable mediums). For example, cache/memory controller 445 may be coupled to an L3 cache, which may, in turn, be coupled to a system memory. In other embodiments, cache/memory controller 445 is directly coupled to a memory. In some embodiments, the cache/memory controller 445 includes one or more internal caches. In some embodiments, the cache/memory controller 445 may include or be coupled to one or more caches and/or memories that include instructions that, when executed by one or more processors, cause the processor, processors, or cores to initiate or perform some or all of the processes described above with reference to FIGS. 1-3. In some embodiments, cache/memory controller 445 may include or may be included SoC 100. For example, cache/memory controller 445 may correspond to controller 108.

As used herein, the term "coupled to" may indicate one or more connections between elements, and a coupling may include intervening elements. For example, in FIG. 4, display unit 465 may be described as "coupled to" central processing unit 420 through fabric 410. In contrast, in the illustrated embodiment of FIG. 4, display unit 465 is "directly coupled" to fabric 410 because there are no intervening elements.

Image sensor processor (ISP) 460 may include dedicated hardware that may facilitate the performance of various stages of an image processing pipeline. In the illustrated embodiment, ISP 460 may be configured to receive image data from image sensor(s), and to process the data into a form that is usable by other components of computing system 400. Image data may pass from the image sensor(s), through ISP 460 to a system memory (e.g., memory system 106 of FIG. 1) or to another functional component (e.g., display unit 465 or CPU 420). In some embodiments, ISP 460 may be configured to perform various image-manipulation operations such as image translation operations, horizontal and vertical scaling, color space conversion or other non-warping image editing operations, and/or image stabilization transformations. In this example, image sensor(s) may be any type of image sensor suitable for capturing image data (e.g., an image sensor that is responsive to captured light), such as an active-pixel sensor (e.g., complementary metal-oxide-semiconductor (CMOS) active-pixel sensor) or charge-coupled device (CCD) photosensor on a camera, video camera, or other device that includes a camera or video camera. In various embodiments, one or more of computing devices 102*a-n* of FIG. 1 may include ISP 460, image sensor(s), or both.

Display unit 465 may be configured to read data from a frame buffer and provide a stream of pixel values for display. Display unit 465 may be configured as a display pipeline in some embodiments. Additionally, display unit 465 may be configured to blend multiple frames to produce an output frame. Further, display unit 465 may include one or more interfaces (e.g., MIPI® or embedded display port (eDP)) for coupling to a user display (e.g., a touchscreen or an external display). In some embodiments, display unit 465 may include or may be included in SoC 100 (e.g., as part of one or more of computing devices 102*a-n*).

I/O bridge 450 may include various elements configured to implement: universal serial bus (USB) communications, security, audio, and/or low-power always-on functionality, for example. I/O bridge 450 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 400 via I/O bridge 450. In some embodiments, central processing unit 420 may be coupled to computing system 400 via I/O bridge 450.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system on a chip (SoC), comprising:
 a plurality of hardware computing devices;
 a shared memory device configured to store data of the plurality of hardware computing devices;
 wherein the hardware computing devices are configured to communicate traffic with the shared memory device, wherein the traffic includes data requests for the data stored in the shared memory device, wherein the traffic has at least a first priority level and a second priority level, and wherein the first priority level is higher priority than the second priority level; and
 a plurality of queues configured to pass the traffic between the shared memory device and the plurality of hardware computing devices, wherein a particular queue of the plurality of queues is configured to allocate a first portion of the particular queue to traffic having the first priority level and to allocate a second portion of the particular queue to traffic having the first priority level or the second priority level.

2. The SoC of claim 1, wherein at least one of the plurality of hardware computing devices is configured to:
 perform one or more operations subject to a scheduling constraint; and
 based on the scheduling constraint, send traffic having the first priority level.

3. The SoC of claim 1, further comprising:
 a controller configured to:
 receive a request to upgrade particular traffic for a particular hardware computing device of the plurality of hardware computing devices, wherein the particular traffic for the particular hardware computing device has the second priority level; and
 based on the received request, upgrade a priority of the particular traffic at the plurality of queues for the particular hardware computing device to the first priority level.

4. The SoC of claim 3, wherein the particular hardware computing device is configured to:
 subsequent to the priority of the particular traffic for the particular hardware computing device being upgraded to the first priority level, send a request that the priority of the particular traffic be downgraded to the second priority level, wherein the sent request is sent based on an amount of the particular traffic for the particular hardware computing device.

5. The SoC of claim 3, wherein the controller is configured to:
 based on an amount of traffic having the first priority level, request that the plurality of queues refuse requests having the second priority level.

6. The SoC of claim 5, wherein the particular queue is configured to:
 in response to a request from the controller to refuse requests having the second priority level, allocate the second portion of the particular queue to traffic having the first priority level.

7. The SoC of claim 1, wherein the particular queue is configured to:
 receive particular traffic having the first priority level; and
 in response to the first portion of the particular queue and the second portion of the particular queue including respective unoccupied entries, store the particular traffic in the second portion of the particular queue.

8. The SoC of claim 1, wherein the particular queue is configured to:
 receiving particular traffic having the first priority level; and
 in response to the first portion of the particular queue and the second portion of the particular queue including respective unoccupied entries, store the particular traffic in the first portion of the particular queue.

9. The SoC of claim 1, wherein the communicated traffic has a third priority level, wherein the second priority level is higher priority than the third priority level.

10. The SoC of claim 9, wherein the particular queue of the plurality of queues is configured to:

allocate a third portion of the particular queue to traffic having the first priority level, the second priority level, or the third priority level.

11. The SoC of claim 9, wherein the first priority level, the second priority level, and the third priority level are assigned in accordance with a quality of service (QoS) framework, wherein the first priority level indicates a highest priority of traffic in the QoS framework, wherein the second priority level indicates an intermediate priority of traffic in the QoS framework, and wherein the third priority level indicates a lowest priority of traffic in the QoS framework.

12. An apparatus, comprising:
a plurality of hardware computing devices;
a memory device configured to store data of the plurality of hardware computing devices; and
a fabric coupled between the plurality of hardware computing device and the memory device;
wherein the hardware computing devices are configured to:
perform actions using the data stored at the memory device, wherein performing the actions includes communicating traffic via the fabric with the memory device, wherein the traffic includes traffic having a first priority level and traffic having a second priority level; and
wherein the fabric includes a first queue having a plurality of entries, and wherein a first subset of the plurality of entries of the first queue is reserved for the traffic having the first priority level, and wherein a second subset of the plurality of entries of the first queue is reserved for the traffic having the first priority level or the traffic having the second priority level.

13. The apparatus of claim 12, wherein the first queue is configured to:
receive traffic from a real-time computing device via a second queue included in the fabric; and
send traffic to the real-time computing device via a third queue included in the fabric.

14. The apparatus of claim 13, wherein the fabric includes a fourth queue, wherein the first queue is configured to:
pass different particular data having the second priority level from a particular hardware computing device of the plurality of hardware computing devices and to the memory device to by:
receiving the different particular data from the second queue; and
sending the different particular data to the fourth queue.

15. The apparatus of claim 14, wherein the fourth queue is configured to refuse traffic having the first priority level.

16. A method, comprising:
receiving, by a queue from a first hardware computing device, a first communication that addresses a memory device, wherein the first communication is a request to read data stored in the memory device, and wherein the first communication has a first priority level;
in response to occupancy of entries of the queue exceeding a threshold level, storing the first communication in one or more entries of the queue, wherein the one or more entries are reserved for communications having at least the first priority level;
receiving, by the queue from a second hardware computing device, a second communication that addresses the memory device, wherein the second communication has a second priority level, and wherein the first priority level is higher priority than the second priority level; and
in response to the occupancy of the entries of the queue exceeding the threshold level, refusing the second communication.

17. The method of claim 16, wherein the threshold level indicates an amount of entries of the queue reserved for communications having at least the first priority level, and wherein the method further comprises:
modifying, by the queue, the threshold level in response to one or more instructions.

18. The method of claim 16, further comprising:
subsequent to refusing the second communication:
receiving, by the queue, the second communication from the second hardware computing device; and
in response to the occupancy of the entries of the queue being less than the threshold level, storing the second communication in one or more different entries of the queue, wherein the one or more different entries are reserved for communications having at least the second priority level.

19. The method of claim 18, further comprising:
receiving, by the queue from a third hardware computing device, a third communication that addresses the memory device, wherein the third communication has the first priority level; and
in response to the occupancy of the entries of the queue being less than the threshold level, storing the third communication in the one or more different entries of the queue.

20. The method of claim 16, further comprising:
receiving, by the queue from the memory device, a third communication that addresses the first hardware computing device, wherein the third communication has the first priority level; and
in response to occupancy of the entries of the queue exceeding the threshold level, storing the third communication in the one or more entries of the queue.

* * * * *